United States Patent [19]

Hadfield et al.

[11] Patent Number: 4,731,650
[45] Date of Patent: Mar. 15, 1988

[54] SPATIAL CHARACTERISTIC DETERMINATION

[75] Inventors: Kevin A. D. Hadfield; Christopher J. Morcom, both of Chelmsford, England

[73] Assignee: English Electric Valve Company Limited, Chelmsford, England

[21] Appl. No.: 891,953

[22] Filed: Aug. 1, 1986

[30] Foreign Application Priority Data

Aug. 13, 1985 [GB] United Kingdom ............... 8520278

[51] Int. Cl.$^4$ ............................................. H04N 7/18
[52] U.S. Cl. .................................... 358/107; 358/93; 358/101; 364/560
[58] Field of Search ................ 358/107, 93, 101; 364/560, 561, 562

[56] References Cited

U.S. PATENT DOCUMENTS

| | | | |
|---|---|---|---|
| 4,115,805 | 9/1978 | Morton | 358/107 |
| 4,207,594 | 6/1980 | Morris | 358/107 |
| 4,310,850 | 1/1982 | Casler | 358/107 |
| 4,319,845 | 3/1982 | Shuji | 356/400 |
| 4,376,584 | 3/1983 | Hart et al. | 356/401 |
| 4,396,944 | 8/1983 | McKenney | 358/107 |
| 4,443,816 | 4/1984 | Hogan | 358/107 |
| 4,628,353 | 12/1986 | Davis | 358/107 |

FOREIGN PATENT DOCUMENTS

| | | |
|---|---|---|
| 1318672 | 10/1971 | United Kingdom . |
| 1446933 | 11/1973 | United Kingdom . |
| 1581948 | 4/1977 | United Kingdom . |
| 2049938 | 4/1980 | United Kingdom . |
| 2083214A | 8/1981 | United Kingdom . |

OTHER PUBLICATIONS

"Electronic Engineering" Technical Journal, Feb. 1981, pp. 41–49.

Primary Examiner—Howard W. Britton
Attorney, Agent, or Firm—Spencer & Frank

[57] ABSTRACT

To determine some spatial characteristic, such as size or shape, of an object, the object is viewed with a television camera that employs an image sensor such as a CCD device. An image is formed on a television screen and a set of measurement markers (or cursors) are superimposed on the image at desired positions. The CCD timing signals are used to accurately determine the position of the cursors and hence the desired spatial characteristic.

9 Claims, 4 Drawing Figures

SPATIAL CHARACTERISTIC DETERMINATION

BACKGROUND AND SUMMARY OF THE INVENTION

This invention concerns spatial characteristic determination, and relates in particular to the determination, and measurement, of the size and shape of objects.

It is common in many technical fields to need to know the exact dimensions of some object. For example, it may be desirable to check the width of a printed circuit board track or the size of structures in a chip-borne integrated circuit. Again, it is often desirable to decide whether the shape of some article falls into one or other of several allowable catagories. Present day methods for measuring object size often make use of an optical system—a telescope or microscope, say—with a very carefully-prepared and calibrated measuring scale in the field of view (functions internally of the system) against which the object's size can be determined. While not unsatisfactory, such arrangements require considerable precision in their design and construction, and so are rather expensive. Because of the flexibility and convenience of electronic images, one possible technique for achieving the desired ends is to view the object with a television (video) camera, form an image of the object on a television screen, superimpose onto the formed image a set of measurement markers (or cursors) whose true spatial positions are known, and move the cursors about to bracket the object image and thus indicate its—and so the object's—real size. This can be done using conventional television systems employing standard cameras of the vidicon type. Using these, though, there are problems in knowing exactly where a generated cursor actually is—what is its true spatial position—and these problems militate against such a solution being of any great value in the measurement, or shape determination, of very small objects (where the likely positional error may be as big as the object being viewed!). These problems can be overcome, however, by using a camera that employs an image sensor in the form of an accurately constructed array of very small sensing elements—as typified by present-day Charge Coupled Device (CCD) image sensors.

One of the major advantages of image sensor arrays is that their array geometry is accurately defined at manufacture. Moreover, because—in effect or in actuality—the output of each array element is examined in sequence and at rigidly defined time intervals (defined by the camera's master clock signal), in a sensor array camera the contribution to the video output of a particular picture element on the array's surface is precisely located in time. This is in marked contrast to conventional pick-up tubes, where the output from any point on the target is dependent on the scan waveforms employed. This feature of array sensor operation may be exploited to simplify dimension measurement, particularly in microscope systems. In essence, it is possible to mix a signal defining one or more marker (cursor) with the array sensor camera output—for example, a pair of horizontal and a pair of vertical cursor lines corresponding to the array's rows and columns of light-sensitive elements (charge-collection sites on a CCD) whose true positions are of course known with great accuracy. By having the positions of the cursor(s) adjustable it is possible to take advantage of the precise geometry of the array sensor to allow measurements to be taken of objects in the view of the camera.

In one aspect, therefore, the invention provides a method of determining a spatial characteristic of an object, in which method:

the object is suitably viewed with a video camera employing an imaging element array sensor to provide an object video image;

one or more marker image (cursor) is generated for superimposition on the video image, the placing of the or each cursor on the video image being determined by the array sensor timing signals, and so corresponding to the position in the array of one or more particular imaging element; and the or each cursor is positioned in the video image to be appropriately aligned with the object image as regards the relevant characteristic;

whereby, from the distance to the or each cursor, known in terms of the array sensor timing signals (and thus of the number and size of the array elements up to the relevant cursor position), there may be determined the required characteristic of the object.

In another aspect the invention provides apparatus for the determination of a spatial characteristic of an object, which apparatus includes:

a video camera employing an imaging element array sensor, by which the object may be suitably viewed to provide an object video image;

cursor generation means, by which one or more marker image (cursor) may be generated for superimposition on the video image, the placing of the or each cursor on the video image being determined by the array sensor timing signals, and so corresponding to the position in the array of one or more particular imaging element; and cursor positioning means, by which the or each cursor may be positioned in the video image to be appropriately aligned with the object image as regards the relevant characteristic;

whereby, from the distance to the or each cursor, known in terms of the array sensor timing signals (and thus of the number and size of the array elements up to the relevant cursor position), there may be determined the required characteristic of the object.

The invention concerns the determination of a spatial characteristic of an object. The spatial characteristic may be the shape of the object, the determination involving a comparison of a "control" shape with the object's shape. Alternatively, the spatial characteristic may be some physical dimension, such as the length or breadth, of the object, the determination involving an actual measurement thereof.

The object, a spatial characteristic of which is to be determined, can be of any sort, large or small, thick or thin. Depending on the optical system associated with the camera, the object might be an integrated circuit component (using an electron microscope), a bacterium (using an optical microscope), a track on a printed circuit board (using an unaided camera lens) or a building or geographical feature (using a telescope). It might even be a heavenly body, such as a galaxy.

The object is suitably viewed with the array sensor camera—that is, it is viewed in an orientation, and at a magnification, appropriate to the characteristic to be determined. Where necessary, then, the viewing is effected via the right sort of optical system—ranging from a microscope to a telescope.

In carrying out the invention the object is viewed with a video—i.e, television—camera employing a solid state array sensor. This array sensor may be of any type—a diode array or an MOS device, for example—but is preferably a charge coupled device (CCD) imaging element array. CCD sensors of this type are well known. These array sensors may be of various different subtypes, sensitive to radiation in the UV, visible or IR regions of the electromagnetic spectrum, but all are characterised by including a dense and very regular array of photosensitive elements of extremely small size. For example, the array may contain over a million such elements, arranged as a square of 1000 by 1000 elements, all in a physical space less than 1" (2.5 cms) square. A typical CCD sensor is that one available from EEV and designated the P8602 (a visible—light, frame-transfer device), which is used in EEV's P4310 series cameras (including the P4312 remote head camera). This particular CCD sensor is about ⅝ inch (roughly 1.6 cms) across, and its sensitive elements (pixels) are about 22 micrometers square.

The viewing with the array sensor camera provides a video image—on whatever visual display unit, such as a television set, is appropriate to the camera's output.

Determination of the chosen characteristic involves aligning the object image with a marker image, or cursor, superimposed on the object video image. There may be one or more cursor, and the or each cursor may take different forms depending on the determination being effected. For example, each cursor may be a single line (itself aligned with a selectable row or column of the array), and there may be two such line cursors disposed as a parallel pair, the distance between them being variable as each line's position (the array row or column) is varied. Indeed, there may be four such lines, disposed as two orthogonal pairs of parallel lines, one pair corresponding to two rows and the other corresponding to two columns. Alternatively, the or each cursor may be an outline of some appropriate shape, possibly variable in both position, rotation and size (the shape would be appropriate to the object whose own shape was to be determined).

The placing of the or each cursor on the video image is determined by the array sensor timing signals. This is a matter that will be well understood in the Art, and need not be discussed further here. Nevertheless, it is convenient to observe that one way of achieving this desideratum is electronically to count the number of picture element read-out pulses since the start of each line and the number of line synchronisation pulses since the start of each video field. These two numbers (picture element count and line count) are the coordinates of the picture element being read out. For example, if the picture element count is five and the line count is six then the element being read out is in the fifth column of the sixth row in the image sensor array. Thus, if a cursor corresponding to this particular element is required it should be placed on the video at this point in time.

When using this invention, the or each cursor is suitably aligned with the object image. Thus, if shape is to be determined with an outline cursor, then the cursor is perhaps rotated, changed in size, and moved left/right or up/down to "fit" over the object. Again, if there is to be measured the width of some object (in a standard orientation), then perhaps two line cursors are merely positioned aligned with either side of the object. The mechanics of this alignment can be any suitable—rotating knobs, thumbwheels and so on—appropriately connected to the controlling electronics, and these latter may themselves be whatever is appropriate to the type of cursor (and will naturally depend on the manner in which there is achieved the placing of the cursor as determined by the array sensor timing signals, as first mentioned hereinabove). Examples of acceptable alignment electronics include counters with comparators and programmable down counters. Counters of the former type are connected so as to count picture element read-out pulses and line sync pulses (as described above). The comparators continually compare the coordinates of the required cursor with those of the picture elements being read out. When the co-ordinates are equal a pulse is generated which is superimposed onto the video signal. This modulates the brightness of the video image at this point, and produces the required cursor. A counter of the latter type, however, is connected so as to be decremented by each picture element read-out pulse. The counter is programmed with a number, C, at the start of a line. When it has been decremented to zero a pulse is generated which is superimposed onto the video signal (in a similar manner to the example given above), and this produces a cursor in column C of that line.

Once the or each cursor is in place the required characteristic of the object may be determined. For instance, a width/length measurement may be effected simply by observing the distance apart of two cursors— this distance is definable in terms of the timing signals for the two cursors, and thus the number of array elements "between" the two. Thus, $$d=(x_2-x_1)\cdot M/P$$

where:
$x_2$ and $x_1$ are the relevant array rows/columns;
P is the array element size (in the $x_2/x_1$ sense); and
M is the magnification of the system.

As can be seen, the invention provides a convenient, accurate and inexpensive way of determining some characteristic, such as shape or size, of an object.

BRIEF DESCRIPTION OF THE DRAWINGS

Various aspects of the invention are now described, though by way of illustration only, with reference to the accompanying Drawings, in which.

DESCRIPTION OF THE PREFERRED EMBODIMENT

Figure 1:
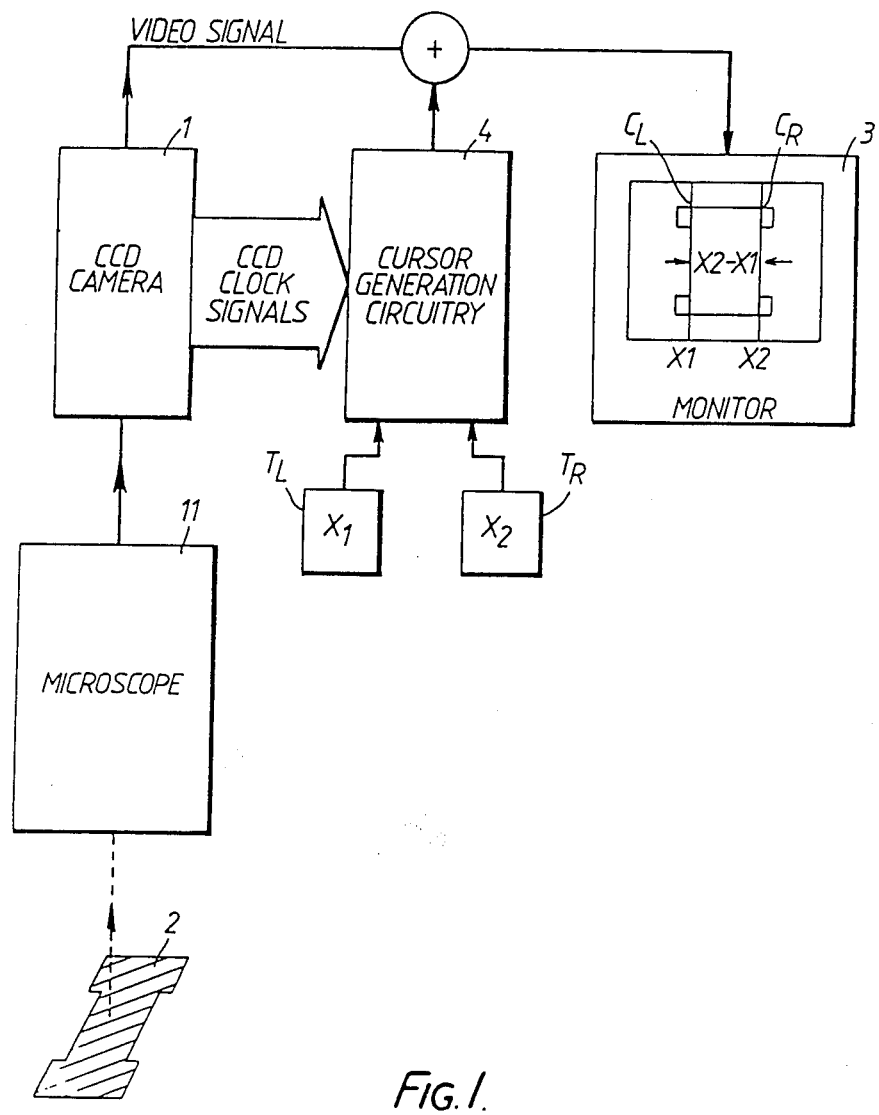
FIG. 1 is a schematic diagram for a measuring system in accordance with the invention.

FIG. 1 shows the main components of a measuring system in accordance with the invention.

A CCD camera (1) is mounted at the focal plane of a microscope (11). The focussed image of the object (2) to be measured is displayed (here shown hatched) on a TV monitor (3). The electronic circuitry (4) is fed with the CCD timing signal, and generates two short pulses timed with CCD columns $x_1$ and $x_2$ (as determined by thumbwheel controls $T_L$, $T_R$). These are electronically superimposed on the video signal, and appear as two cursor lines ($C_L$, $C_R$) projected on to the image of the object (2). When the cursors are aligned with the structure their separation will be $x_2-x_1$ picture elements; due to the accuracy of the CCD array geometry, this is directly related to the structure dimension d by the expression $$d=(x_2-x_1)\cdot M/P$$

(where:
P=picture element size;
M=magnification).

Figure 2:
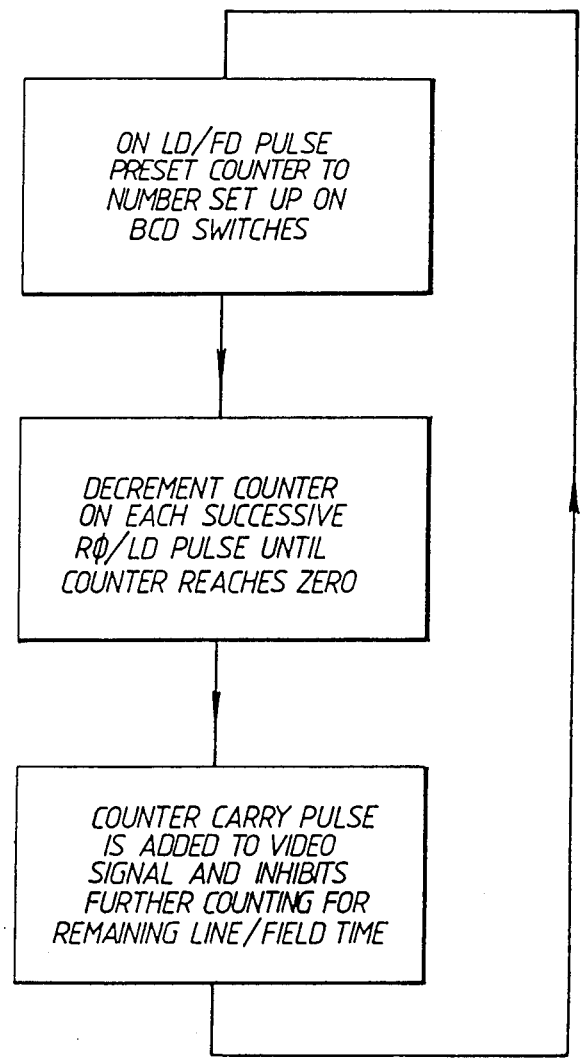
FIG. 2 is a simple Flow Chart for one embodiment of the invention.
Figure 3:
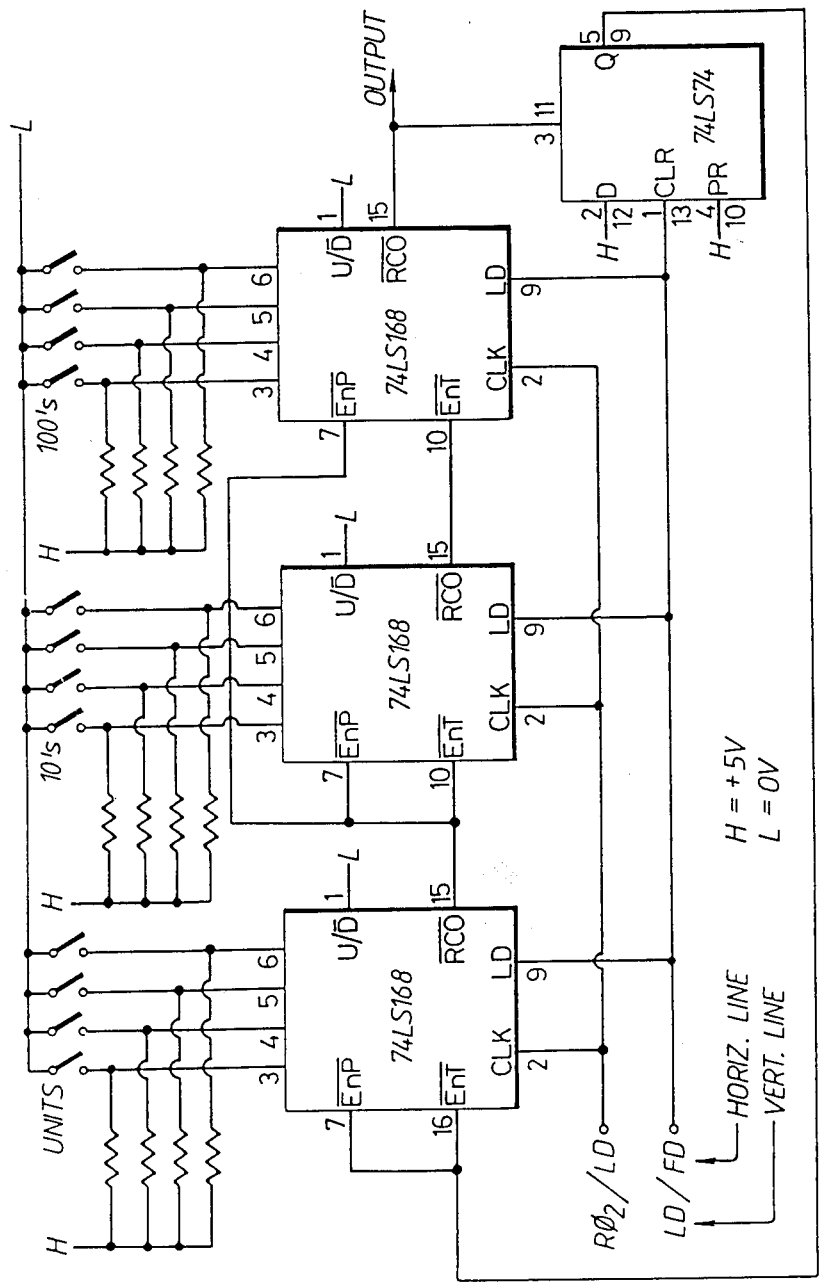
FIG. 3 is a schematic circuit diagram for a connection arrangement useful with the same embodiment.
Figure 4:
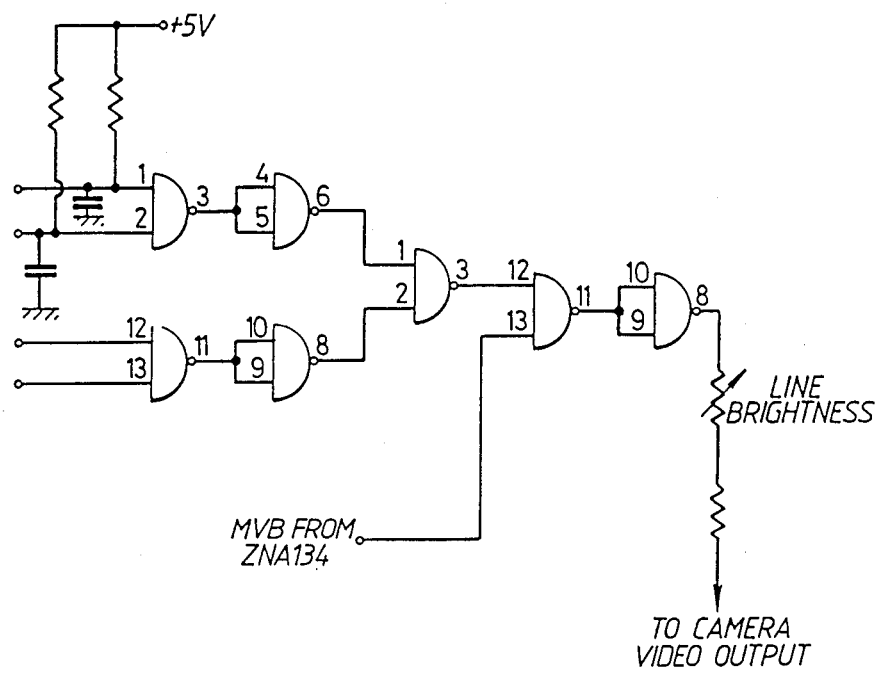
FIG. 4 is a cursor-control circuit relating to the same embodiment.

A flowchart of the cursor generator is shown in FIG. 2, and the electronics are shown in FIGS. 3 and 4.

The position of each cursor is determined by a counter consisting of three 74LS168 TTL ICs (see FIG. 3). The counter is preset to the number specified by the BCD switches, and is decremented at intervals until it reaches zero and a carry pulse is generated. The carry pulse is used to alter the brightness of the video signal to generate the cursor, and also triggers the flip flop (74LS74) which inhibits further counting.

A horizontal cursor is generated by presetting the counter with Field Sync. (Field Drive) and decrementing it on subsequent Line Sync. (Line Drive) pulses. A vertical cursor is generated by presetting the counter with Line Drive and decrementing it on the output register ($R\phi_2$) pulses.

When more than one cursor is required it is necessary to combine the carry pulses from several of these counters using logic gates. FIG. 4 shows how four carry pulses can be combined using 74LS00 gates to allow four cursors to be displayed simultaneously. The signal is gated with MVB to ensure that the cursors are only injected during picture time and cannot interfere with the sync information in the video signal.

The output of the final gate is added to the video signal through a resistor and a preset potentiometer which allows the intensity of the cursors to be adjusted (a fainter line may allow the edges of some objects to be more easily located).

Dimension Measurements

Linear dimensions are determined by placing one cursor on each edge of the object or structure which is being measured. The difference between the numbers indicated on the BCD switches correspondings is directly proportional to the required. The constant of proportionality can be determined in two different ways.

(i) If the magnification of the optical system is M and the picture element size on the CCD is P, then the constant is P/M.

(ii) The system can be directly calibrated by observing an object with a known dimension. This technique is particularly valuable for optical systems where the precise overall magnification is not known.

The second method of calibration was used by viewing a diode array, the diodes of which were 14 micrometers squares. Using a x100 objective the diodes were 79 columns wide and 79 rows high. This implies that each column or row moved by the cursor was equivalent to a distance of 14/79=0.1772 micrometers.

The prototype was then used to measure the size of structures on a silicon wafer of a ⅔ inch Charge Coupled Device, and the following results were obtained.

1. Distance between nitride implants
$x_2=221$, $x_1=96$ $x_2-x_1=125$
distance=125×0.1772=22.15 micrometers 2. Distance between each three polysilicon electrodes
$x_2=268$, $x_1=141$ $x_2-x_1=124$
distance=124×0.1772=21.97 micrometers These dimensions correspond to the pixel size of the CCD. They are actually 22 micrometers on the ⅔ inch device, and the measured values are within 1% of this.

What we claim is:

1. Apparatus for the determination of a spatial characteristic of an object, which includes:
a video camera employing an imaging element array sensor, by which the object may be suitably viewed to provide an object video image;
cursor generation means, by which at least one cursor may be generated for superimposition on the video image, the placing of the at least one cursor on the video image being determined by array sensor timing signals, and so corresponding to the position in the array of at least one particular imaging element; and
cursor positioning means, by which the at least one cursor may be positioned in the video image to be appropriately aligned with the object image as regards the relevant characteristic;
whereby, from the distance to the at least one cursor, known in terms of the array sensor timing signals and thus known in terms of the number and size of the array elements up to the relevant cursor position, there may be determined the required characteristic of the object.

2. Apparatus as claimed in claim 1, wherein the spatial characteristic determined is some physical dimension of the object.

3. Apparatus as claimed in claim 1, wherein the camera's imaging element array sensor is a charge coupled device imaging element array.

4. Apparatus as claimed in claim 1, wherein the placing of the at least one cursor on the video image in accordance with the array sensor timing signals is achieved by counting the number of picture element read-out pulses since the start of each line to obtain a picture element count number and by counting the number of line synchronisation pulses since the start of each video field to obtain a line count number, the picture element count number and the line count number being the co-ordinates of the picture element being read out, and placing the cursor on the video image at this point in time.

5. Apparatus as claimed in claim 1, wherein the alignment of the at least one cursor with the object image is achieved using counters with comparators or programmable down counters.

6. Apparatus as claimed in claim 1, wherein there are generated at least two cursors, superimposed on the object video image.

7. Apparatus as claimed in claim 6, wherein each cursor is a single line which is itself aligned with a selectable row or column of the array, and two such line cursors are disposed as a parallel pair, the distance between them being variable as each line's position, corresponding to an array row or column, is varied.

8. Apparatus as claimed in claim 7, wherein there are four such lines, disposed as two orthogonal pairs of parallel lines, one pair corresponding to two rows and the other corresponding to two columns.

9. A method of determining a spatial characteristic of an object, in which method:

the object is suitably viewed with a video camera employing an imaging element array sensor to provide an object video image;

at least one cursor is generated for superimposition on the video image, the placing of the at least one cursor on the video image being determined by array sensor timing signals, and so corresponding to the position in the array of at least one particular imaging element; and the at least one cursor is positioned in the video image to be appropriately aligned with the object image as regards the relevant characteristic;

whereby, from the distance to the at least one cursor, known in terms of the array sensor timing signals and thus known in terms of the number and size of the array elements up to the relevant cursor position, there may be determined the required characteristic of the object.

* * * * *